US009692057B2

(12) United States Patent
Majima et al.

(10) Patent No.: US 9,692,057 B2
(45) Date of Patent: Jun. 27, 2017

(54) COPPER-COVERED STEEL FOIL, NEGATIVE ELECTRODE, AND BATTERY

(71) Applicant: NISSHIN STEEL CO., LTD., Tokyo (JP)

(72) Inventors: Sho Majima, Osaka (JP); Takao Tsujimura, Osaka (JP); Takeshi Shimizu, Osaka (JP); Yoshikazu Morita, Osaka (JP); Takahiro Fujii, Osaka (JP); Norihiro Kon, Yamagata (JP); Yoshie Yoshida, Yamagata (JP)

(73) Assignee: NISSHIN STEEL CO., LTD., Tokyo (JP)

( * ) Notice: Subject to any disclaimer, the term of this patent is extended or adjusted under 35 U.S.C. 154(b) by 0 days.

(21) Appl. No.: 15/064,696

(22) Filed: Mar. 9, 2016

(65) Prior Publication Data

US 2016/0190598 A1    Jun. 30, 2016

Related U.S. Application Data

(60) Division of application No. 13/737,294, filed on Jan. 9, 2013, now Pat. No. 9,368,799, which is a
(Continued)

(30) Foreign Application Priority Data

Jul. 9, 2010    (JP) ................................ 2010-157365
Jun. 15, 2011    (JP) ................................ 2011-133556

(51) Int. Cl.
*H01M 4/66* (2006.01)
*H01M 4/04* (2006.01)
(Continued)

(52) U.S. Cl.
CPC ............. *H01M 4/661* (2013.01); *B23K 20/04* (2013.01); *B23K 20/227* (2013.01);
(Continued)

(58) Field of Classification Search
None
See application file for complete search history.

(56) References Cited

U.S. PATENT DOCUMENTS

2002/0142211 A1* 10/2002 Nakanishi ............. H01M 2/263
    429/94
2009/0297953 A1* 12/2009 Shimizu ................ H01M 4/587
    429/231.95
(Continued)

FOREIGN PATENT DOCUMENTS

JP    4-237955    8/1992
JP    2000-048823    2/2000
(Continued)

OTHER PUBLICATIONS

JIS G 3141:2005 Cold-reduced carbon steel sheets and strips.*
(Continued)

*Primary Examiner* — Scott J. Chmielecki
(74) *Attorney, Agent, or Firm* — Clark & Brody

(57) ABSTRACT

A negative electrode collector using a copper-covered steel foil for carrying a negative electrode active material for lithium ion secondary batteries has a steel sheet as the core material thereof and has, on both surfaces thereof, a copper covering layer having a mean thickness $t_{Cu}$ of from 0.02 to 5.0 μm on each surface, and of which the total mean thickness, t, including the copper covering layer 7 is from 3 to 100 μm with $t_{Cu}/t$ of at most 0.3. The steel sheet can be common steel, austenitic stainless steel, or ferritic stainless steel. The copper covering layer can be a copper electroplating layer (including one rolled after plating). On the surface of the copper covering layer, for example, a carbon-based active material layer that has been densified through strong roll pressing is formed, and the copper-covered steel foil and the carbon-based active material layer constitute the negative electrode collector.

14 Claims, 2 Drawing Sheets

Related U.S. Application Data continuation of application No. PCT/JP2011/065707, filed on Jul. 8, 2011.

(51) Int. Cl.

| | | |
|---|---|---|
| B23K 20/04 | (2006.01) | |
| B23K 20/227 | (2006.01) | |
| C25D 7/06 | (2006.01) | |
| H01M 4/133 | (2010.01) | |
| C22C 38/00 | (2006.01) | |
| C22C 38/02 | (2006.01) | |
| C22C 38/04 | (2006.01) | |
| C22C 38/06 | (2006.01) | |
| C22C 38/42 | (2006.01) | |
| C22C 38/44 | (2006.01) | |
| C22C 38/50 | (2006.01) | |
| C22C 38/60 | (2006.01) | |
| C25D 3/38 | (2006.01) | |
| C25D 5/10 | (2006.01) | |
| C25D 5/12 | (2006.01) | |
| B32B 15/01 | (2006.01) | |
| C22C 38/20 | (2006.01) | |
| C22C 38/22 | (2006.01) | |
| C22C 38/26 | (2006.01) | |
| C22C 38/28 | (2006.01) | |
| C22C 38/32 | (2006.01) | |
| C22C 38/46 | (2006.01) | |
| C22C 38/48 | (2006.01) | |
| H01M 4/587 | (2010.01) | |
| H01M 10/0525 | (2010.01) | |
| B23K 101/16 | (2006.01) | |
| B23K 101/34 | (2006.01) | |
| B23K 101/38 | (2006.01) | |
| B23K 103/22 | (2006.01) | |
| H01M 10/052 | (2010.01) | |
| H01M 4/02 | (2006.01) | |

(52) U.S. Cl.
CPC .......... *B32B 15/015* (2013.01); *C22C 38/001* (2013.01); *C22C 38/002* (2013.01); *C22C 38/004* (2013.01); *C22C 38/02* (2013.01); *C22C 38/04* (2013.01); *C22C 38/06* (2013.01); *C22C 38/20* (2013.01); *C22C 38/22* (2013.01); *C22C 38/26* (2013.01); *C22C 38/28* (2013.01); *C22C 38/32* (2013.01); *C22C 38/42* (2013.01); *C22C 38/44* (2013.01); *C22C 38/46* (2013.01); *C22C 38/48* (2013.01); *C22C 38/50* (2013.01); *C22C 38/60* (2013.01); *C25D 3/38* (2013.01); *C25D 5/10* (2013.01); *C25D 5/12* (2013.01); *C25D 7/0614* (2013.01); *H01M 4/0404* (2013.01); *H01M 4/133* (2013.01); *H01M 4/587* (2013.01); *H01M 4/662* (2013.01); *H01M 4/667* (2013.01); *H01M 10/0525* (2013.01); *B23K 2201/16* (2013.01); *B23K 2201/34* (2013.01); *B23K 2201/38* (2013.01); *B23K 2203/22* (2013.01); *H01M 10/052* (2013.01); *H01M 2004/027* (2013.01); *H01M 2220/30* (2013.01); *Y02E 60/122* (2013.01); *Y02P 70/54* (2015.11); *Y02T 10/7011* (2013.01)

(56) References Cited

U.S. PATENT DOCUMENTS

| | | | |
|---|---|---|---|
| 2009/0311599 A1* | 12/2009 | Kawai | H01M 4/587 429/217 |
| 2010/0099031 A1 | 4/2010 | Kato et al. | |
| 2010/0143743 A1 | 6/2010 | Yamasaki et al. | |
| 2010/0300574 A1* | 12/2010 | Jinnouchi | B21C 37/09 138/145 |

FOREIGN PATENT DOCUMENTS

| | | |
|---|---|---|
| JP | 2002-319408 | 10/2002 |
| JP | 3838878 | 8/2006 |
| JP | 2007-194024 | 8/2007 |
| JP | 2008-016456 | 1/2008 |
| JP | 2008-098157 | 4/2008 |
| JP | 2008-293716 | 12/2008 |
| JP | 2009-004363 | 1/2009 |
| WO | 02/093679 | 11/2002 |

OTHER PUBLICATIONS

JIS G4305-2005 Cold-rolled stainless steel plate, sheet and strip.*
A240/A240M-10 Standard Specification for Chromium and Chromium-Nickel Stainless Steel Plate, Sheet, and STrip for Pressure Vessels and for General Applications.*

* cited by examiner

COPPER-COVERED STEEL FOIL, NEGATIVE ELECTRODE, AND BATTERY

This application is a Divisional of U.S. Ser. No. 13/737,294 filed on Jan. 9, 2013, which is a Continuation of PCT/JP2011/065707 filed on Jul. 8, 2011, which is published as WO2012/005355 on Jan. 12, 2012.

TECHNICAL FIELD

The present invention relates to a copper-covered steel foil for negative electrode collectors of lithium ion secondary batteries. The invention also relates to a negative electrode collector for lithium ion secondary batteries, which carries an active material held on the surface of the copper-covered steel foil, and its production method, and also to a lithium ion secondary battery using the negative electrode collector.

BACKGROUND ART

Recently, for environmental protection, development of new energy alternative to fossil fuel such as petroleum oil or the like and technical development for efficiently utilizing energy have become promoted. As part of these, solar power generation and wind power generation are being rapidly popularized. However, these power generation methods utilizing natural energy are susceptible to the weather, and, therefore, the output power is often unstable. Accordingly, in massive introduction of such new energy, electrical storage technology for leveling output power and also electrical storage technology for effectively utilizing the electric power to be generated in light-load time such as nighttime or the like are indispensable. As a relatively large-scale storage battery for use for storage of such new energy, there are mentioned a sodium sulfur battery (NAS battery), a redox flow battery, a lead storage battery, etc., and these have been tried in verification test researches.

On the other hand, as storage batteries for mobile electronic appliances such as typically mobile phones and notebook-size personal computers, a lithium ion secondary battery has become widely popularized. As relatively large sized storage batteries on a level usable as driving power sources for hybrid vehicles or electric vehicles, at present, a nickel hydrogen secondary battery is the mainstream. In future, however, for meeting the needs of high-performance storage batteries, lithium ion secondary batteries are expected to be further popularized also for driving power sources for vehicles. Further in future, application of lithium ion secondary batteries would be taken into consideration also for storage of new energy. In view of these, recently, high-capacity lithium ion secondary batteries have become strongly desired.

CITATION LIST

Patent References

Patent Reference 1: WO2002/093679
Patent Reference 2: Japanese Patent 3838878

SUMMARY OF THE INVENTION

Problems that the Invention is to Solve

A lithium ion secondary battery has a configuration in which a positive electrode collector of an aluminum foil and a negative electrode collector of a copper foil are arranged in a lithium ion electrolytic solution. Various types of configurations are known, of which those constructed by laminating a positive electrode collector and a negative electrode collector followed by winding them into a columnar shape and those constructed by alternately laminating tens sheets of positive electrode collectors and negative electrode collectors are general configurations. As a small-capacity battery, there is known a configuration constructed by laminating one sheet of a positive electrode collector and one sheet of a negative electrode collector. The surface of the positive electrode collector and that of the negative electrode collector each carry a positive electrode active material and a negative electrode active material held thereon, respectively. The collectors of the two electrodes are separated from each other via a separator such as a resin porous film or the like.

In this description, the configuration of the inside of the battery in which these two electrode collectors are laminated is referred to as "electrode laminate". Of tabular (sheet-like) metal materials, in particular, one having a thickness of at most 100 μm is referred to as "foil".

The aluminum foil and the copper foil for use in a lithium ion secondary battery have a low strength and are therefore readily deformed in the production line in which the foil is coated with an active material; and consequently, for producing collectors having a high shape accuracy, high-level special control is needed. Under poor control, the foil strip may be broken in the production line. Regarding battery products, in particular, "laminate-type" lithium ion secondary batteries where the battery contents are sealed up in a mode of laminated package are advantageous for large-size products as excellent in heat radiation characteristics, but on the other hand, the disadvantage thereof is that the electrode laminate may be deformed when a local external force is applied thereto from outside the batteries and the collector may be thereby readily damaged. Further, the volume of the active material may change through charge-discharge cycles in use of battery products; however, it is difficult to completely uniformize the arrangement of the electrode laminate inside the battery, and therefore the part where the given stress is concentrated may be readily damaged when the strength of the collector is low.

On the other hand, for providing high-capacity batteries, it is desired to increase the discharge capacity per unit volume of the collector therein. For this, it is advantageous that the active material exists at a high density on the surface of the collector. For increasing the density of the active material layer, it is effective to strongly press the coating film of the active material with a roll press or the like. However, as described below, it is difficult to further density the active material layer of the collector that uses a conventional aluminum foil or copper foil.

FIG. 1 schematically shows the condition of the cross section of a material in forming an active material layer according to a roll-pressing method. A coating film 2 that contains an active material is formed on the surface of the metal foil 1 that is a core material of the collector; and by pressing by the rotating roll 3, the thickness of the coating film 2 is reduced to form the active material layer 4. In general, the metal foil 1 is an aluminum foil in a positive electrode collector, and is a copper foil in a negative electrode collector. In FIG. 1, the metal foil 1, the coating film 2 and the active material layer 4 are overdrawn in point of the thickness thereof, and the thickness ratio does not always reflect the actual dimension.

FIG. 2 schematically shows the condition of the cross section of the material in passing through rolls, as seen in the direction A in FIG. 1, in which a suitable rolling force is given to the material in forming the active material layer according to a roll-pressing method. In case where the rolling force given by the rolls 3 is a suitable one, the active material layer 4 can be formed with little deformation of the metal foil 1. In FIG. 2, the metal foil 1 and the active material layer 4 are overdrawn in point of the thickness thereof.

FIG. 3 schematically shows the condition of the cross section of the material in passing through rolls, as seen in the direction A in FIG. 1, in which an excessive rolling force is given to the material in forming the active material layer according to a roll-pressing method. In this case, the rolling force given by the rolls 3 is larger than that in the case of FIG. 2. With the increase in the given rolling force, the active material layer 4 may be more densified. However, the metal foil 1 is an aluminum foil or a copper foil and the strength thereof is low, and consequently, there has occurred plastic deformation in the center part in the width direction of the foil, therefore providing a so-called "center buckle" state. In case where an uncoated part 5 is provided at around the edges of the metal foil 1 in the width direction thereof, the thickness difference between the edges and the center part may become more remarkable. The center buckle state brings about various problems of shape failure and dimensional accuracy reduction with collector materials. Consequently, the rolling force by the rolls 3 is controlled to fall within a range within which the aluminum foil or the copper foil does not deform, and this is a bar to the densification of the active material layer 4.

An object of the present invention is to provide a negative electrode collector having higher strength and durability and to provide a negative electrode collector having a larger discharge capacity, as one elemental technique that may bring about providing high-capacity lithium ion secondary batteries. Another object is to provide a lithium ion secondary battery using the negative electrode collector.

Means for Solving the Problems

The above-mentioned objects can be attained by a copper-covered steel foil for carrying a negative electrode active material for lithium ion secondary batteries, which has a steel sheet as a core material thereof and has, on both surfaces thereof, a copper covering layer having a mean thickness $t_{Cu}$ of from 0.02 to 5.0 μm on each surface, and of which the total mean thickness, t, including the copper covering layer is from 3 to 100 μm with $t_{Cu}/t$ of at most 0.3. The copper covering layer includes, for example, a copper electroplating layer (including one that has been rolled after plating) and a copper foil layer integrated with the steel sheet through cladding.

For the steel sheet that is the core material of the copper-covered steel foil, usable here are a cold-rolled common steel sheet and an austenitic or ferritic stainless steel sheet as the material thereof. As standardized products of a case of common steel, for example, those made of materials of cold-rolled steel plates (including steel strips) as defined in JIS G3141:2009 are applicable. To a case of stainless steel, for example, steel plates (including steel strips) having an austenitic or ferritic chemical composition as defined in JIS G4305:2005 are applicable.

Concrete content ranges of the component elements that constitute the steel sheet are exemplified below.

[Common Steel]

In terms of % by mass, C: 0.001 to 0.15%, Si: 0.001 to 0.1%, Mn: 0.005 to 0.6%, P: 0.001 to 0.05%, S: 0.001 to 0.5%, Al: 0.001 to 0.5%, Ni: 0.001 to 1.0%, Cr: 0.001 to 1.0%, Cu: 0 to 0.1%, Ti: 0 to 0.5%, Nb: 0 to 0.5%, N: 0 to 0.05%, with balance of Fe and inevitable impurities.

[Austenitic Stainless Steel]

In terms of % by mass, C: 0.0001 to 0.15%, Si: 0.001 to 4.0%, Mn: 0.001 to 2.5%, P: 0.001 to 0.045%, S: 0.0005 to 0.03%, Ni: 6.0 to 28.0%, Cr: 15.0 to 26.0%, Mo: 0 to 7.0%, Cu: 0 to 3.5%, Nb: 0 to 1.0%, Ti: 0 to 1.0%, Al: 0 to 0.1%, N: 0 to 0.3%, B: 0 to 0.01%, V: 0 to 0.5%, W: 0 to 0.3%, total of Ca, Mg, Y, REM (rare earth metal): 0 to 0.1%, with balance of Fe and inevitable impurities.

[Ferritic Stainless Steel

In terms of % by mass, C: 0.0001 to 0.15%, Si: 0.001 to 1.2%, Mn: 0.001 to 1.2%, P: 0.001 to 0.04%, S: 0.0005 to 0.03%, Ni: 0 to 0.6%, Cr: 11.5 to 32.0%, Mo: 0 to 2.5%, Cu: 0 to 1.0%, Nb: 0 to 1.0%, Ti: 0 to 1.0%, Al: 0 to 0.2%, N: 0 to 0.025%, B: 0 to 0.01%, V: 0 to 0.5%, W: 0 to 0.3%, total of Ca, Mg, Y, REM (rare earth metal): 0 to 0.1%, with balance of Fe and inevitable impurities.

In the above, the element of which the lowermost limit is 0% is an optional element. The copper-covered steel foil that uses any of these steel sheets has a higher strength than that of the copper foil heretofore applied to ordinary collectors. In particular, the copper-covered steel foil having a controlled tensile strength of from 450 to 900 MPa is advantageous in enhancing the durability of collectors, and more advantageously, the tensile strength thereof is controlled to be more than 600 to 900 MPa.

The invention also provides a negative electrode collector for lithium ion secondary batteries, which is produced by forming a negative electrode active material layer for lithium ion secondary batteries, on the surface of at least one copper covering layer of the above-mentioned copper-covered steel foil. Further, the invention provides a lithium ion secondary battery using the negative electrode collector for the negative electrode thereof. Here "at least one copper covering layer" means one or both of the copper covering layers to cover the two surfaces of the copper-covered steel foil. In case where a carbon-based active material is applied, preferably, the density of the active material layer is at least 1.50 g/cm$^3$ like usual. For increasing the discharge capacity, more preferably, the density of the carbon-based active material is at least 1.80 g/cm$^3$, even more preferably at least 2.00 g/cm$^3$.

The invention also provides a method for producing a negative electrode collector for lithium ion secondary batteries, which comprises:

a step of forming a coating film that contains a carbon-based active material for negative electrodes of lithium ion secondary batteries, on the surface of at least one copper covering layer of the above-mentioned copper-covered steel foil, and a step of roll-pressing the coating film, after drying it, to reduce the coating film thickness by from 30 to 70% thereby densifying the coating film.

In this case, preferably, the density of the coating film is increased to at least 1.80 g/cm$^3$ by roll pressing, more preferably to at least 2.00 g/cm$^3$.

Advantage of the Invention

The invention has made it possible to provide a metal foil for negative electrode collectors for lithium ion secondary batteries that has a higher strength than conventional one. Accordingly, the durability of batteries can be enhanced, and the invention can meet the needs of increasing the area of collectors and reducing the thickness thereof. In addition, the metal foil can be prevented from undergoing plastic deformation to be caused by volume change of the negative electrode active material in charge/discharge of batteries, and is therefore advantageous for life prolongation of batteries. Further, in the production step for negative electrode collectors, the metal foil hardly deforms, and therefore collectors having a higher dimensional accuracy can be realized. In particular, it is easy to much more densify the active material layer than usual, and a negative electrode collector having a high discharge capacity can be produced at a low cost. Accordingly, the invention contributes toward improving the durability of lithium ion secondary batteries, prolonging the life thereof and increasing the capacity thereof.

MODE FOR CARRYING OUT THE INVENTION

Figure 1:
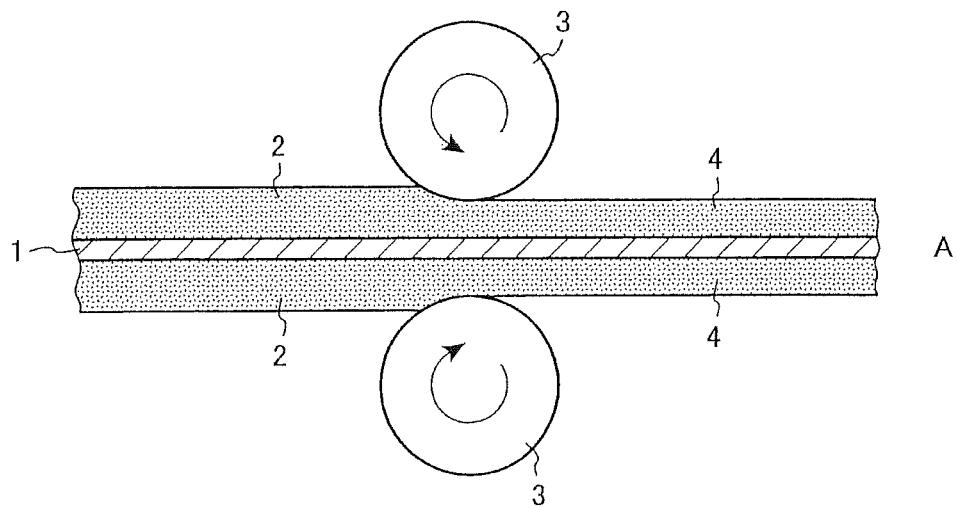
FIG. 1 A view schematically showing the condition of the cross section of a material in forming an active material layer on the surface of a metal foil according to a roll-pressing method in a collector production step for lithium ion secondary batteries.
Figure 2:
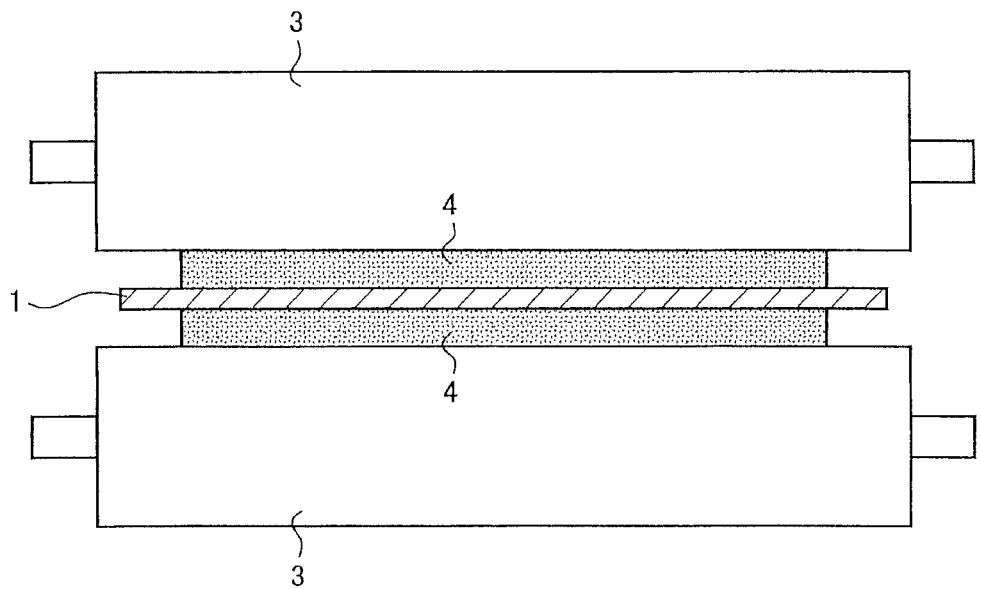
FIG. 2 A view schematically showing the condition of the cross section of the material in passing through rolls, as seen in the direction A in FIG. 1, in which a suitable rolling force is given to the material in forming the active material layer according to a roll-pressing method.
Figure 3:
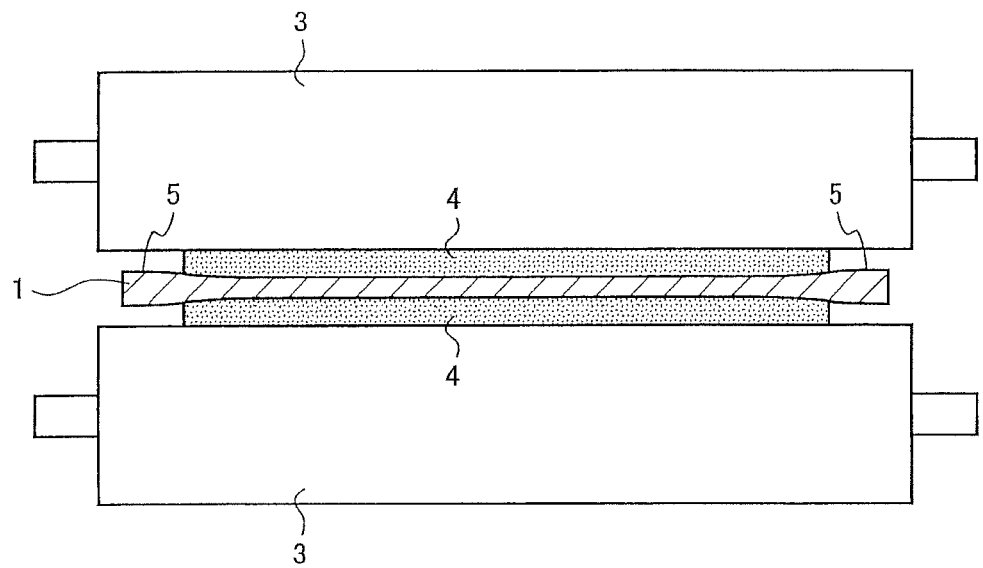
FIG. 3 A view schematically showing the condition of the cross section of the material in passing through rolls, as seen in the direction A in FIG. 1, in which an excessive rolling force is given to the material in forming the active material layer according to a roll-pressing method.
Figure 4:
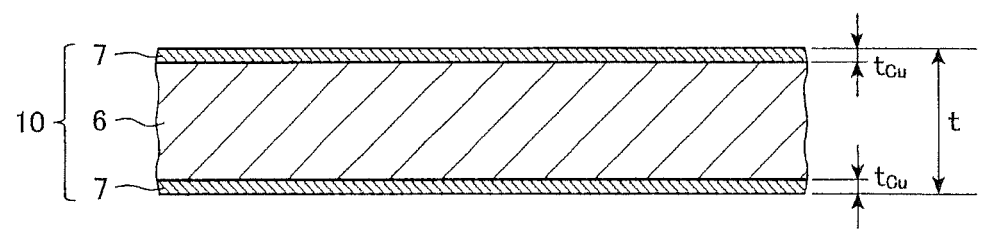
FIG. 4 A view schematically showing the cross-sectional configuration of the copper-covered steel foil of the invention for carrying a negative electrode active material thereon.

FIG. 4 schematically shows the cross-sectional configuration of the copper-covered steel foil of the invention for carrying thereon a negative electrode active material for lithium ion secondary batteries. Both surfaces of the steel sheet 6 are covered with the copper covering layer 7 to constitute the copper-covered steel foil 10. In FIG. 4, the thickness of the copper covering layer 7 is overdrawn (the same shall apply to FIG. 5 to be mentioned below). On both surfaces, the copper covering layer 7 is so controlled that the mean thickness $t_{Cu}$ falls from 0.02 to 5.0 μm on each surface, and the total mean thickness, t, including the copper covering layer falls from 3 to 100 μm. The ratio of $t_{Cu}/t$ is at most 0.3 on the two surfaces. Preferably, the copper covering layer 7 has nearly a uniform thickness on both surfaces. The copper covering layer 7 may be formed, for example, according to a copper electroplating method to be mentioned below. In case where the steel sheet 6 is stainless steel, preferably, a nickel strike plating layer is formed as the metal underlayer. So far as the mean thickness $t_{Cu}$ of the copper covering layer 7 and the mean thickness t of the copper-covered steel foil 10 each fall within the range satisfying the above-mentioned condition, the presence between the steel sheet 6 and the copper covering layer 7 of one or more metal underlayers having good adhesiveness to the two layers causes no problem. However, the total mean thickness $t_M$ on each surface of the other metal underlayers than copper is preferably so controlled that the total ($t_M+t_{Cu}$) with the mean thickness $t_{Cu}$ of the copper covering layer 7 formed on the underlayers is at most 5.0 μm. In case where copper strike plating is given, it is considered that the copper strike plating layer constitutes a part of the copper covering layer 7.

When the mean thickness t of the copper-covered steel foil 10 is less than 3 μm, then it would be difficult to make the copper-covered steel foil 10 fully secure the strength and the necessary active material carrying amount for collectors, even when a high-strength steel sheet 6 is applied thereto. The thickness may be controlled to fall within a range of at least 5 μm, or at least 7 μm. On the other hand, when t is more than 100 μm, then it could not meet the requirement for small-sized large-capacity batteries. In general, it is desirable that the thickness is controlled to fall within a range of at most 50 μm, or may be controlled to fall within a range of at most 25 mμ, or at most 15 μm.

When the mean thickness $t_{Cu}$ on each surface of the copper covering layer 7 is less than 0.02 μm, then the absolute amount of high-conductivity copper in the copper-covered steel foil 10 may reduce and defects such as pinholes and the like running through the copper covering layer 7 may increase, whereby it would be difficult to maintain a high and stable discharge capacity of batteries. $t_{Cu}$ may be controlled to be at least 0.03 μm, or at least 0.05 μm. On the other hand, when $t_{Cu}$ is more than 5.0 μm, then the copper covering layer 7 would readily undergo plastic deformation in case where the rolling force is increased in the roll-pressing step, and it would be difficult to realize a more highly densified active material layer while maintaining a high dimensional accuracy thereof. Another disadvantage is that the copper plating cost would increase. In case where emphasis is placed on securing the dimensional accuracy of the collector and on densifying the active material layer, more preferably, $t_{Cu}$ is controlled to fall within a range of at most 1.0 μm or less than 1.0 μm.

When the mean thickness t of the copper-covered steel foil 10 is reduced to at most 20 μm or so, if the mean thickness $t_{Cu}$ of the copper covering layer 7 is not reduced with that, then it would be difficult to prevent the copper covering layer 7 from undergoing plastic deformation in roll pressing. As a result of various investigations, when $t_{Cu}/t$ is at most 0.3, the deformation of the copper covering layer 7 can be effectively restrained by the steel sheet 6 and the range is advantageous for producing collectors with high dimensional accuracy. More preferably, $t_{Cu}/t$ is at most 0.2, or even at most 0.1.

The copper-covered steel foil 10 using the steel sheet 6 as the core material thereof has a dramatically higher strength as compared with the copper foil used in conventional collectors. Use of the steel sheet 6 controlled to have the above-mentioned component composition is more effective. For stably and remarkably enhancing the durability of the collector when it is incorporated in a battery and enhancing the shape retention capability (center buckling preventing ability) in a roll pressing step for forming the negative electrode active material layer, it is more effective to make the copper-covered steel foil 10 have a tensile strength of from 450 to 900 MPa. The tensile strength may be controlled to be at least 500 MPa. In particular, the copper-covered steel foil 10 that is controlled to have a strength on a level more than 600 MPa or on a level more than 650 MPa is extremely advantageous for enhancing the reliability of collectors. The tensile strength of the copper-covered steel foil 10 can be controlled by selecting the chemical composition of the steel sheet 6 and by controlling the cold-rolling reduction ratio before obtaining the final copper-covered steel foil 10. Even when the tensile strength is so increased as to be more than 900 MPa, any more enhancement of durability and shape retention capability could not be expected but on the contrary, there may increase some disadvantage of cost increase owing to the increase in the cold-rolling reduction ratio.

Figure 5:
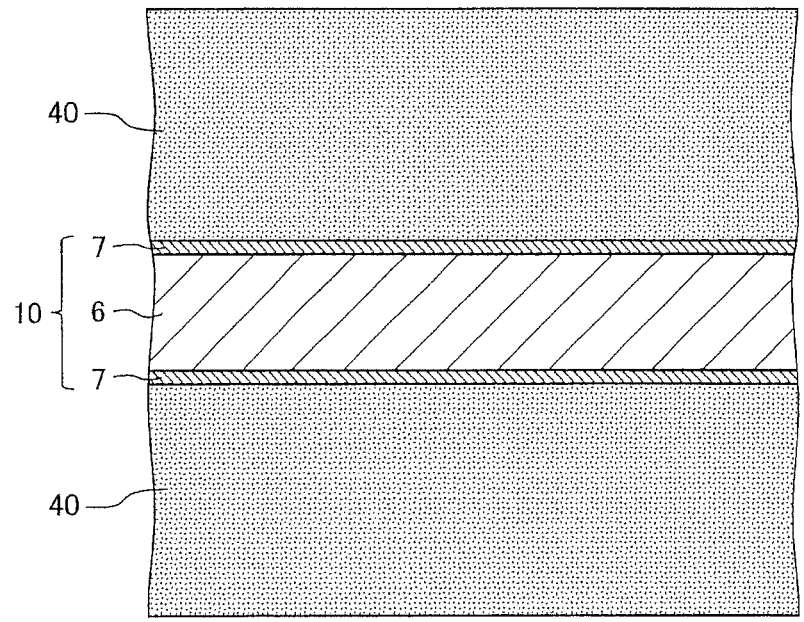
FIG. 5 A view schematically showing the cross-sectional configuration of the negative electrode collector of the invention.

FIG. 5 schematically shows the cross-sectional configuration of the negative electrode collector of the invention for lithium ion secondary batteries. On the surface of the copper covering layer 7 that constitutes the copper-covered steel foil 10, formed is a negative electrode active material layer 40 that has been densified by roll pressing or the like. This drawing illustrates a case where the negative electrode active material layer 40 is formed on both surfaces of the copper-covered steel foil 10; however, a negative electrode collector where the negative electrode active material layer 40 is formed on one surface alone may also be employable. For example, in the collector to be positioned at the edges of an electrode laminate, the negative electrode active material layer 40 may be formed on one surface alone.

The mean thickness of the densified, negative electrode active material layer 40 is preferably from 5 to 150 µm on one surface, more preferably from 20 to 100 µm. In a case of the negative electrode active material layer 40 that contains a carbon-based active material (to be mentioned below), preferably, the density thereof (including fine pores inside the layer) is at least 1.50 g/cm$^3$. According to the process to be mentioned below, the density of the carbon-based active material layer can be at least 1.80 g/cm$^3$, or even at least 2.00 g/cm$^3$. The densified negative electrode active material layer provides not only the durability enhancing effect through strengthening of the metal foil 1 but also the discharge capacity increasing effect per unit volume of the active material layer, over conventional negative electrode collectors (in which, for example, the density of the active material layer is from 1.50 to 1.75 g/cm$^3$ or so). On the other hand, however, when the density of the active material layer is too high, an electrolytic solution could hardly penetrate into the layer thereby providing a factor of interfering with charge movement. In consideration of the fact that the theoretical density of graphite is 2.26 g/cm$^3$, the density of the carbon-based active material layer is preferably within a range of at most 2.20 g/cm$^3$, and may be controlled to fall within a range of at most 2.15 g/cm$^3$. The density of the active material layer can be calculated from the mean thickness of the active material layer, which is determined through microscopic observation of the cross section of collector, and the mean mass per unit area of the active material layer.

[Exemplification of Production Process of Negative Electrode Collector]

Examples of a production process for producing the copper-covered steel foil of the invention and then using it for producing a collector for lithium ion secondary batteries, include the following A to D. Inside the parenthesis [ ], an intermediate or final material is shown.

A. →[cold-rolled steel plate]→rolling into foil→copper plating→[copper-covered steel foil]→coating with active material-containing coating material→drying of coating film→roll pressing→shaping and working by cutting, etc.→[negative electrode collector]

A2. →[cold-rolled steel plate]→rolling into foil→copper plating→further rolling→[copper-covered steel foil]→coating with active material-containing coating material→drying of coating film→roll pressing→shaping and working by cutting, etc.→[negative electrode collector]

B. →[cold-rolled steel plate]→copper plating→rolling into foil→[copper-covered steel foil]→coating with active material-containing coating material→drying of coating film→roll pressing→shaping and working by cutting, etc.→[negative electrode collector]

C. →[cold-rolled steel plate]→cladding with copper foil→rolling into foil→[copper-covered steel foil]→coating with active material-containing coating material→drying of coating film→roll pressing→shaping and working by cutting, etc.→[negative electrode collector]

D. →[cold-rolled steel plate]→rolling into foil→cladding with copper foil→[copper-covered steel foil]→coating with active material-containing coating material→drying of coating film→roll pressing→shaping and working by cutting, etc.→[negative electrode collector]

In the above-mentioned process A, a cold-rolled steel plate is, after rolled into a foil having a predetermined thickness, plated with copper in the step of producing the copper-covered steel foil; in the process A2, a cold-rolled steel plate is, after rolled into a foil, plated with copper, and is further rolled into the copper-covered steel foil having a predetermined thickness; in the process B, a cold-rolled steel plate is, after plated with copper, rolled into a foil to be a copper-covered steel foil having a predetermined thickness. As a the strike plating, employable here is copper strike plating or nickel strike plating. In the process C, a cold-rolled steel plate is clad with a copper foil, and then further rolled into a copper-covered steel foil having a predetermined thickness; and in the process D, a cold-rolled steel plate is rolled into a foil, and then clad with a copper foil to be a copper-covered steel foil having a predetermined thickness.

[Steel Sheet]

As the steel sheet that is the core material of the copper-covered steel foil of the invention, employable are common steel and also stainless steel. Stainless steel is excellent in corrosion resistance and is favorable for use where emphasis is placed on securing high durability and reliability. The concrete chemical composition range is as described above.

[Copper Plating]

As a method for forming a copper covering layer, employable here is a copper plating method as exemplified in the above-mentioned processes A, A2 and B. In the invention, employable is any known copper plating technique, for example, including electroplating, chemical plating, vapor-phase plating, etc. As chemical plating, there may be mentioned electroless plating; and as vapor-phase plating, there may be mentioned sputtering, ion plating. Of those, the copper electroplating method is favorable for mass-production, since the plating layer can be formed relatively rapidly and economically and since the plating thickness is easy to control.

Copper Electroplating:

Employable here are various known copper electroplating methods. The copper electroplating condition in one case of using a sulfuric acid bath is exemplified. For example, using a plating bath that contains copper sulfate of from 200 to 250 g/L and sulfuric acid of from 30 to 75 g/L and has a liquid temperature of from 20 to 50° C., the cathode current density may be from 1 to 20 A/dm². However, depending on a case of rolling a copper-plated foil to have a predetermined thickness after copper plating or a case of directly forming a copper covering layer having an intended thickness though copper plating, the copper plating amount varies greatly. In the former case, it is necessary to form the copper plating layer of which the thickness is estimated through back calculation from the intended thickness of the copper covering layer, in accordance with the rolling reduction ratio in the later step. When the necessary copper plating thickness could not be obtained in the first try in the copper plating line, the plate may be led to pass through the copper plating line several times.

Pretreatment for Copper Electroplating:

In copper electroplating, a pretreatment of nickel strike plating may be performed. In particular, when the steel sheet is stainless steel, nickel strike plating is especially effective for enhancing the adhesiveness of the copper plating to the steel sheet. The nickel strike plating condition may be set as follows. For example, using a plating bath at normal temperature that contains nickel chloride of from 230 to 250 g/L and hydrochloric acid of 125 ml/L and has a pH of from 1 to 1.5, the cathode current density may be from 1 to 10 A/dm².

In place of nickel strike plating, a pretreatment of copper strike plating may be performed prior to copper electroplating. The copper strike plating condition may be set as follows. For example, using a plating bath that contains copper pyrophosphate of from 65 to 105 g/L, potassium pyrophosphate of from 240 to 450 g/L in a ratio (P ratio) of the total pyrophosphate ion concentration (g/L) to the total copper ion concentration (g/L) of from 6.4 to 8.0, and aqueous ammonia of from 1 to 6 mL/L, and has a liquid temperature of from 50 to 60° C. and a pH of from 8.2 to 9.2, the cathode current density may be within a range of from 1 to 7 A/dm².

Vapor-Phase Plating:

The copper covering layer may be formed according to any known vapor-phase plating method of vapor deposition, sputtering, ion plating or the like. A case of the production method through sputtering is exemplified. First, a cold-rolled common steel plate or a cold-rolled stainless steel plate is cold-rolled to a foil having a predetermined thickness, using a foil-rolling machine, thereby giving a steel foil. The steel foil is pre-treated for degreasing in a wet washing line that comprises processing steps of "methylene chloride washing→drying→isopropyl alcohol washing→water washing→drying". Next, the degreased steel foil is led to pass through a continuous sputtering line to form a copper covering layer thereon. The continuous sputtering line may be constituted by, for example, a series of a coil withdrawing unit, a high frequency magnetron sputtering unit and a winding unit arranged in a vacuum chamber.

Concretely, for example, the sputtering may be performed according to the following method. The argon partial pressure inside the chamber is controlled at around 0.1 Pa, and the surface of the steel foil is activated through reverse sputtering at an output power of about 100 W. Next, a copper covering layer having a mean thickness $t_{Cu}$ of about 0.05 µm is formed on one surface of the steel foil through film formation sputtering using pure copper as the target at an output power of about 300 W. In this stage, the plate traveling speed in the continuous sputtering line is controlled to thereby adjust the intended mean thickness $t_{Cu}$. The operation is repeated while the surface and the back of the steel foil are turned over, thereby giving a copper-covered steel foil using the steel sheet as a core material and having the copper covering layer on both surfaces thereof.

[Cladding]

As another method for producing the copper-covered steel foil, employable here is a method of cladding both surfaces of a cold-rolled steel plate or steel foil with a copper foil. As the cladding method, known are a hot-cladding method, a cold-cladding method, an explosive bonding method, etc. In particular, the cold-cladding method is suitable for mass-production since it is excellent in thickness accuracy and secures good producibility.

Of the above-mentioned production process C, a method of using a cold cladding mode to produce a copper-covered steel foil is exemplified. As the materials, one cold-rolled steel strip and two copper foil strips of which thicknesses have been so controlled that the above-mentioned ratio $t_{Cu}/t$ could be a predetermined value are prepared. As the copper foil strip, there are mentioned foil strips of tough pitch copper, oxygen-free copper, alloy copper, etc. These are led to pass through a degreasing line to remove the rolling oil therefrom, and then both surfaces of the cold-rolled steel strip are sandwiched between the copper foil strips to give a three-layered laminate, which is then continuously cold-rolled for cold cladding, thereby producing a clad material where the three layers have been integrated through cladding. When the cold-rolling reduction ratio in cladding is too low, then the appearance of a new plane at the interface between the steel strip and the copper foil strip would be insufficient and the cladding strength may be thereby insufficient. When the cold-rolling reduction ratio is too high, the rolling load may be excessive thereby providing some problems in that the rolled shape may deform or, the rolled laminate may be broken in the line owing to the excessive tensile load given thereto. As a result of various investigations, the cold-rolling reduction ratio for cladding could fall within a range of from approximately 10 to 75%; however, the ratio is more preferably from 40 to 50% for a cold-rolled steel plate of common steel, and from 15 to 40% for stainless steel. The obtained clad material is cold-rolled with a foil-rolling machine to give a copper-covered steel foil.

The case is more concretely exemplified. For example, as a cold-rolled steel plate, one steel strip having a thickness of 0.684 mm is prepared; and as copper foils, two copper foil strips each having a thickness of 0.018 mm are prepared. These are layered to form a three-layer laminate material having a total thickness of 0.018+0.684+0.018=0.720 mm. This is cold-clad at a rolling reduction ratio of 50% to give a three-layer clad material having a thickness of 0.36 mm. This is further led to pass through a foil-rolling machine several times to give a copper-covered steel foil. In every rolling, the layer thickness ratio of the material before cladding is kept nearly as such, and in this case, the copper covering layer on both surfaces has $t_{Cu}/t$=0.018 mm/0.720 mm=0.025. When the mean thickness t of the obtained copper-covered steel foil is 20 µm, the mean thickness $t_{Cu}$ of the copper covering layer on one surface is 0.025×20 µm=0.5 µm on both sides of the copper-covered steel foil.

As in the above-mentioned production process D, a cold-rolled steel plate is previously rolled to a foil to give a steel foil, and the steel foil may be cold-clad with a copper foil to give a copper-covered steel foil. In this case, a copper-covered steel foil controlled to have a predetermined thickness can be directly produced using a cladding machine; however, in this, the copper foil to be supplied for cold-cladding is extremely thin and may need special care in handling it.

In the cold-cladding method, for realizing more stable and better cladding performance, it is effective to perform cold-cladding operation in a non-oxidative atmosphere, a reduced-pressure atmosphere or a vacuum atmosphere. As pretreatment for cladding, it may also be effective to previously activate the surface to be clad, through vapor-phase etching such as argon plasma etching or the like.

[Rolling into Foil]

For rolling into foil in the above-mentioned production processes A to D, usable is any ordinary rolling machine capable of giving a high rolling force, such as a Sendzmir rolling machine, a cluster rolling machine, etc. In these rolling machines, the work rolls are prevented from being elastically deformed by the action of many backup rolls, and therefore the shape of the copper-covered steel foil or the steel foil to be produced is easy to control suitably. The rolling reduction ratio r is represented by the following formula, in which the thickness before rolling is $t_{in}$ and the thickness after rolling is $t_{out}$.

Rolling Reduction Ratio $r$ (%)$(1-t_{out}/t_{in})\times 100$

As described above, a steel sheet is used as the core material in the copper-covered steel foil of the invention, and therefore, as compared with that of conventional copper foil for collectors, the strength level of the copper-covered steel foil of the invention is high. For optimizing the strength level in accordance with the specifications of batteries, it is effective to suitably control the total rolling reduction ratio in cold rolling (including cold rolling in cladding) which the finally-annealed steel material receives until it becomes the core material for the final copper-covered steel foil. As a result of various investigations, for obtaining a copper-covered steel foil having an especially high-level strength, it is extremely effective to attain the above-mentioned total rolling reduction ratio of at least 90%; and for further increasing the strength, the total rolling reduction ratio may be 95% or even more. The uppermost limit of the total rolling reduction ratio is restrained mainly by the capability of the rolling machine to be used, but any excessive strengthening would be uneconomical. In general, the total rolling reduction ratio may be good to be at most 99%, and may be within a range of at most 98% in consideration of the economic potential and producibility.

[Formation of Active Material-Containing Coating Film]

The negative electrode collector of the invention comprises the copper-covered steel foil obtained in the above, and a negative electrode active material layer formed on the surface thereof. The negative electrode active material layer has pores into which an electrolytic solution can penetrate to enable charge movement therethrough with lithium ions, and contains a negative electrode active material, a conductivity additive, a binder, etc. The negative electrode active material may be any one that enables insertion and release of lithium ions. For example, there is mentioned a carbon-based active material that includes pyrocarbons, cokes (pitch coke, needle coke, petroleum coke, etc.), graphites, glassy carbons, fired organic polymers (prepared by firing and carbonizing furan resin or the like at a suitable temperature), carbon fibers, active carbons, etc. As the conductivity additive, usable here are, for example, graphites, acetylene black, ketjen black, channel black, furnace black, lamp black, thermal black, carbon fibers, metal fibers, etc. As the binder, usable here are, for example, polyvinylidene fluoride (PVDF), polytetrafluoroethylene (PTFE), polyethylene, polypropylene, tetrafluoroethylene-hexafluoropropylene copolymer (FEP), vinylidene fluoride-hexafluoropropylene copolymer, etc.

In this description, the negative electrode active material using the above-mentioned carbon material is referred to as "carbon-based active material". The negative electrode active material layer using the carbon-based active material is referred to as "carbon-based active material layer". The process for forming the carbon-based active material layer comprises, for example as described above, processing steps of "coating with active material-containing coating material→drying of coating film→roll pressing" may be adopted. In this case, first, a coating material that contains the carbon-based active material for negative electrodes of lithium ion secondary batteries as described above (active material-containing coating material) is prepared, and this is applied onto the surface of the copper covering layer of a copper-covered steel foil according to a blade coater coating method or the like. Subsequently, the coating film is dried. The thickness of the dried coating film is estimated through back calculation from the intended thickness of the active material layer, taking the coating film thickness reduction in the subsequent roll-pressing step, into consideration. In case where the active material layer is formed on both surfaces of the copper-covered steel foil, preferably, the coating thickness is nearly uniform on the two surfaces.

[Densification of Active Material Layer]

For increasing the discharge capacity of electrodes, it is effective to increase the density of the active material layer. As a method for increasing the density of the active material layer, generally employed is a method of reducing the thickness of the above-mentioned dry coating film through roll pressing. In the invention, the copper-covered steel foil having a high strength is used, and therefore, even when the rolling force in roll pressing is increased, the metal foil hardly undergoes plastic deformation. Accordingly, in the invention, the rolling force in roll pressing can be increased more than before.

Concretely, it is desirable that the thickness of the dry coating film is reduced by at least 30% through roll pressing to thereby increase the density of the resulting layer. The coating film thickness reduction ratio is defined by the following formula (1):

[Coating Film Thickness Reduction Ratio (%)]=$(h_0-h_1)/h_0\times 100$    (1)

wherein $h_0$ means the mean coating film thickness (μm) on one surface before roll pressing; and $h_1$ means the mean coating film thickness (μm) after rolling press. In case where emphasis is placed on densifying the active material layer, the coating film thickness reduction ratio is more effectively at least 35%, even more preferably at least 40%. However, when the rolling force is too large, then the coating film density would be excessive, and if so, electrolytic solution could not penetrate into the coating film easily and a space necessary for charge movement through the layer could not be fully secured. Another disadvantage is that the metal foil would be ununiformly deformed. As a result of various investigations, the coating film thickness reduction ratio by roll pressing is preferably within a range of at most 70%, and may be controlled to be at most 60%.

[Lithium Ion Secondary Battery]

The negative electrode collector that has the negative electrode active material layer that has been densified in the manner as above, on the surface of the above-mentioned copper-covered steel foil may be combined with a positive electrode collector via a separator to give an "electrode laminate", and as combined with an electrolytic solution, this constitutes a lithium ion secondary battery. For the positive electrode collector, the separator and the electrolytic solution, any known materials used for lithium ion secondary batteries and any other new materials usable in place of them are employable here.

The electrolytic solution is exemplified. As the solvent, for example, there are mentioned nonaqueous solvents such as ethylene carbonate (EC), diethyl carbonate (DEC), propylene carbonate, butylene carbonate, dimethyl carbonate, sulfolane, dimethoxyethane, tetrahydrofuran, dioxolan, etc. One or more of these may be used either singly or as combined. As the solute, for example, there are mentioned $LiClO_4$, $LiPF_6$, $LiBF_4$, $LiAsF_6$, $LiN(CF_3SO_2)_2$, $LiN(C_2F_5SO_2)_2$, $LiN(CF_3SO_2)(C_4F_9SO_2)$, $LiC(CF_3SO_2)_3$, $LiCF_3(CF_2)_3SO_3$, etc. One or more of these may be used either singly or as combined.

As the shape of the casing material to seal up and case therein the above-mentioned electrode laminate and the electrolytic solution, there are mentioned coin shape, cylindrical shape, rectangular shape, laminate sheet pack-type or the like. As the material of the casings, there are mentioned aluminum or its alloy, titanium or its alloy, nickel or its alloy, copper or its alloy, stainless steel, common steel, nickel-plated steel sheet, copper-plated steel sheet, zinc-plated steel sheet, etc. For the laminate sheet pack-type casing, for example, usable is a laminate foil prepared by laminating a heat-sealable resin film on a metal foil such as an aluminum foil, stainless steel foil, etc.

EXAMPLES

Various types of copper-covered steel foils were produced according to the above-mentioned production processes A to D, and tested for corrosion resistance thereof in an electrolytic solution. Some copper-covered steel foils were tested to measure the tensile strength thereof. In addition, using the respective copper-covered steel foils, negative electrode collectors for lithium ion secondary batteries were produced, and tested to evaluate the discharge capacity thereof. Examples codes (a, b, etc.) correspond to the codes of "production process" described in Table 2 given hereinunder.

[Production of Copper-Covered Steel Foil Having Common Steel Sheet as Core Material]

Example a

This example demonstrates production of a copper covered steel foil according to the above-mentioned production process B.

A plurality of cold-rolled steel strips (annealed strips) each having the following chemical composition and having a thickness of 0.3 mm and a width of 200 mm were prepared. Chemical Composition: in terms of % by mass, C: 0.003%, Al: 0.038%, Si: 0.003%, Mn: 0.12%, P: 0.012%, S: 0.122%, Ni: 0.02%, Cr: 0.02%, Cu: 0.01%, Ti: 0.073%, N: 0.0023%, with balance of Fe and inevitable impurities.

In a continuous electroplating line, both surfaces of the steel strip were processed for copper strike plating and copper electroplating (main plating) to give copper-plated steel strips having a copper plating layer in a varying thickness. In one copper-plated steel strip, the copper plating layer thickness on both surfaces was nearly uniform. Subsequently, this was cold-rolled with a foil-rolling machine, thereby giving a copper-covered steel foil of which the mean thickness t including the copper plating layer on both surfaces was 20 μm and of which the mean thickness $t_{Cu}$ on one surface of the copper covering layer was in a different stage of from 0.9 to 0.005 μm. In this case, the thickness of the copper plating layer (that is, the total plating amount of the copper strike plating and the main plating) to be formed on the surface of the steel strip having a thickness of 0.3 mm was estimated through back calculation in such a manner that, when the mean thickness t of the copper-covered steel foil was controlled to be 20 μm after cold rolling, the mean thickness $t_{Cu}$ of the copper covering layer could be a predetermined one falling within a range of from 0.9 to 0.005 μm. For example, in case where a copper-covered steel foil having $t_{Cu}$ of 0.5 μm is to be obtained, the plating thickness shall be 7.9 μm on one surface.

For the copper strike plating, used was a copper strike plating bath containing copper pyrophosphate of 80 g/L, potassium pyrophosphate of 300 g/L and aqueous ammonia of 3 mL/L, and having a P ratio of 7, a liquid temperature of 55° C. and a pH of 9. The cathode current density was 5 $A/dm^2$, and the plating thickness on one surface was 0.3 μm.

For the copper electroplating (main plating), used was a copper plating bath containing copper sulfate of 210 g/L and sulfuric acid of 45 g/L and having a liquid temperature of 40° C. The cathode current density was 10 $A/dm^2$.

For confirming the formation of the copper covering layer having the predetermined thickness, a copper-covered steel foil that had been so produced as to have the copper covering layer having an intended thickness of 0.5 μm was cut and polished in a mode of ion-milling, then observed with an electron microscope, and the thickness of the copper covering layer was measured. From one sample, three test pieces were collected at three sites spaced from each other at intervals of 5 m in the rolling lengthwise direction, and three views of each one test piece were observed. As a result, 3 views×3 sites=9 views in total were analyzed. The minimum value of the found data was 0.42 μm, the maximum value thereof was 0.55 μm, and the mean value thereof was 0.48 μm. Accordingly, it was confirmed that the foil rolling that had been carried out herein realized nearly the just intended accurate rolling.

[Production of Copper-Covered Steel Foil Having Stainless Steel Sheet as Core Material]

Example b

This example demonstrates production of a copper-covered steel foil according to the above-mentioned production process A.

Commercially-available, cold-rolled steel strips of SUS 304 and SUS 430 (both annealed strips corresponding to JIS G4305:2005) were cold-rolled with a foil-rolling machine, thereby preparing steel foils each having a thickness of 20 μm. In an electroplating line, both surfaces of the steel foil were processed for nickel strike plating and copper electroplating to produce a copper-covered steel foil having a mean thickness $t_{Cu}$ of the copper covering layer on one surface of 0.5 μm or 0.05 μm. The nickel strike plating thickness was about 0.2 μm on one surface. In one copper-covered steel foil, the copper covering layer had nearly a uniform thickness on both surfaces of the foil.

Example c

This example demonstrates production of a copper-covered steel foil according to the above-mentioned production process A2.

A commercially-available, cold-rolled steel strip of SUS 304 (annealed strip corresponding to JIS G4305:2005) was cold-rolled with a foil-rolling machine, thereby preparing a steel foil having a thickness of 20 pin. In an electroplating line, both surfaces of the steel foil were processed for nickel strike plating and copper electroplating to produce a copper-covered steel foil (intermediate product) having a mean thickness of the copper covering layer on one surface of 0.5 μm. The nickel strike plating thickness was about 0.2 μm on one surface. The copper-covered steel foil was further rolled with a foil-rolling machine to produce a copper-covered steel foil having a mean thickness t including the copper covering layer of 8.0 μm and having a mean thickness $t_{Cu}$ of the copper plating layer on one surface of 0.2 μm. The copper covering layer thickness on both surfaces was uniform.

Example d

This example demonstrates production of a copper-covered steel foil according to the above-mentioned production process C.

A cold-rolled, SUS 430-equivalent ferritic stainless steel strip (annealed strip) having the following chemical composition and having a thickness of 0.684 mm and a width of 300 mm was prepared.

Chemical Composition: in terms of % by mass, C: 0.058%, Al: 0.009%, Si: 0.56%, Mn: 0.31%, P: 0.021%, S: 0.005%, Ni: 0.20%, Cr: 16.7%, Mo: 0.32%, Cu: 0.031%, N: 0.030%, with balance of Fe and inevitable impurities.

Two rolled copper foil strips each having the following chemical composition and having a thickness of 18 μm and a width of 300 mm were prepared.

Chemical Composition: in terms of % by mass, O: 0.0003%, P: 0.0002%, with balance of Cu and inevitable impurities.

The above-mentioned cold-rolled stainless steel strip and rolled copper foil strips were led to pass through a degreasing washing line to thereby remove the rolling oil therefrom respectively, and then configured in three layers in such a manner that the cold-rolled stainless steel strip could be sandwiched between the rolled copper foil strips each put on the surface and the back thereof, and thereafter led to pass through a continuous cold-cladding line. This was thus cold-rolled to a rolling reduction ratio of 50%, thereby giving a three-layer clad structure having a thickness of 0.36 mm. This was further cold-rolled with a foil-rolling machine, thereby giving a copper-covered steel foil, of which the mean thickness t including the copper covering layer was 20 μm and of which the mean thickness $t_{Cu}$ on one surface of the copper covering layer was 0.5 μm.

Example e

This is another example that demonstrates production of a copper-covered steel foil according to the above-mentioned production process C.

A cold-rolled, SUS 430-equivalent ferritic stainless steel strip and rolled copper foil strips each having the same composition as in the above-mentioned Example d were prepared. The cold-rolled stainless steel strip had a thickness of 1.8 mm and a width of 300 mm; and the rolled copper foil strips each had a thickness of 38 μm and a width of 300 mm. According to the same process as in the above-mentioned Example d, a three-layer clad structure was produced at a cold-rolling reduction ratio of 50%. This was further cold-rolled with a foil-rolling machine, thereby giving a copper-covered steel foil, of which the mean thickness t including the copper covering layer was 100 μm and of which the mean thickness $t_{Cu}$ on one surface of the copper covering layer was 2.0 μm.

Example f

This is still another example that demonstrates production of a copper-covered steel foil according to the above-mentioned production process C.

A cold-rolled, SUS 430-equivalent ferritic stainless steel strip and rolled copper foil strips each having the same composition as in the above-mentioned Example d were prepared. The cold-rolled stainless steel strip had a thickness of 0.5 mm and a width of 300 mm; and the rolled copper foil strips each had a thickness of 63 μm and a width of 300 mm. According to the same process as in the above-mentioned Example d, a three-layer clad structure was produced at a cold-rolling reduction ratio of 50%. This was further cold-rolled with a foil-rolling machine, thereby giving a copper-covered steel foil, of which the mean thickness t including the copper covering layer was 50 μm and of which the mean thickness $t_{Cu}$ on one surface of the copper covering layer was 5 μm.

Example g

This example demonstrates production of a copper-covered steel foil according to the above-mentioned production process D.

A SUS 430-equivalent ferritic stainless steel strip (annealed strip) and rolled copper foil strips each having the same composition as in the above-mentioned Example d were prepared. The cold-rolled stainless steel strip had a thickness of 0.6845 mm and a width of 300 mm; and the rolled copper foil strips each had a thickness of 12 μm and a width of 300 mm. The cold-rolled stainless steel strip was cold-rolled with a foil-rolling machine to give a steel foil strip having a thickness of 15 μm. The steel foil strip was kept sandwiched between the rolled copper foil strips on both surfaces thereof, and rolled in a continuous cold-cladding line at a cold-rolling ratio of 38%, thereby giving a copper-covered steel foil, of which the mean thickness t including the copper covering layer was 15 μm and of which the mean thickness $t_{Cu}$ on one surface of the copper covering layer was 4.5 μm.

[Corrosion Resistance Test in Electrolytic Solution]

The above-mentioned copper-covered steel foils having any steel sheet of common steel, SUS304 or SUS430 as the core material thereof were tested for the corrosion resistance thereof in an electrolytic solution. Test pieces having a size of 30×50 mm, as cut out of each copper-covered steel foil, were tested. At the edges of the test piece, the steel base of the steel sheet was exposed out. As an electrolytic solution for lithium ion secondary batteries, a solution was prepared in which $LiPF_6$ was dissolved, at a concentration of 1 mol/L, in a mixed solvent of ethylene carbonate (EC) and diethyl carbonate (DEC) in a ratio by volume of 1/1. A globe box equipped with a vapor circulating purifier was used here. In the globe box in which the oxygen concentration and the moisture concentration were controlled to be at most 1 ppm each, the test piece was immersed in the electrolytic solution at 25° C. for 4 weeks. The corrosion resistance was evaluated through measurement of the mass of the test piece before and after the immersion test, and through ICP-AES quantitative analysis of Fe and Cu dissolved in the electrolytic solution.

As a result, any significant mass change was not detected in every test piece before and after the immersion test. The Fe concentration and the Cu concentration in the electrolytic solution in which each of the test pieces had been immersed were each less than the detection limit (less than 1 ppm) in ICP-AES analysis, and therefore could not be quantified. No dissolution of Fe and Cu in the electrolytic solution was detected. From these, it has been confirmed that the above-mentioned respective copper-covered steel foils show good corrosion resistance in the electrolytic solution for lithium ion secondary batteries.

[Tensile Test]

The above-mentioned copper-covered steel foils produced through the copper plating step (the foils of the invention with $t_{Cu}$=0.5 µm, produced in Examples a and b), a commercial copper foil (comparative foil), and a commercial aluminum foil (comparative foil) were tested in a tensile test using a universal precision tensile tester. The dimension of the test piece was 12.7 mm in width and 175 mm in length; and the rolling direction was the lengthwise direction thereof. In the initial stage, the chuck-to-chuck distance was 125 mm, and the tensile test was conducted at a pulling rate of 2 mm/min until each test piece broke. In the test, the maximum load given to the test piece was divided by the initial cross section (measured value) of the test piece to give the tensile strength of the tested foil. Every sample was tested for multiple test runs of n=3. The found data were averaged and the average value is referred to as the tensile strength of the tested foil. The results are shown in Table 1.

TABLE 1

| Group | Type | Thickness (µm) | Steel Sheet | Copper covering layer Forming Method | Copper covering layer Thickness on one surface (µm) | Tensile Strength (MPa) |
|---|---|---|---|---|---|---|
| Foil of the Invention | copper-covered steel foil | 20.0 | common steel | copper plating | 0.5 | 710 |
| Foil of the Invention | copper-covered steel foil | 21.4 | SUS430 | copper plating | 0.5 | 755 |
| Foil of the Invention | copper-covered steel foil | 21.4 | SUS304 | copper plating | 0.5 | 854 |
| Comparative Foil | copper foil | 20 | — | — | — | 210 |
| Comparative Foil | copper foil (hard) | 18 | — | — | — | 420 |
| Comparative Foil | aluminum foil | 20 | — | — | — | 87 |

It is found that the copper-covered steel foils of the invention have an extremely high strength, as compared with the copper foil used for the negative electrode collector in existing lithium ion secondary batteries and with the aluminum foil used for the positive electrode collector therein. The strength of the copper-covered steel foil can be controlled on a different level by controlling the cold-rolling reduction ratio in the production process. The tensile strength of the copper-covered steel foils shown in Table 1 is a case of some examples, and the present inventors have separately confirmed that the tensile strength of the copper-covered steel foils of the invention can be controlled within a range of from 450 to 900 MPa. According to the investigations made by the present inventors, it is quite possible to produce, by the use of existing rolling technology, copper-covered steel foils having a tensile strength of more than 600 MPa or even more than 650 MPa when various types of steel are used for steel sheets.

[Production of Negative Electrode Collector Sample]

90 parts by mass of graphite powder as a negative electrode active material, 5 parts by mass of acetylene black as a conductivity additive, and 5 parts by mass of polyvinylidene fluoride as a binder were mixed, and the resulting mixture was dispersed in N-methyl-2-pyrrolidone for preparing a slurry, and thereby obtaining an active material-containing coating material. The coating material was applied on one surface of the copper-covered steel foil produced in the Example and on one surface of a copper foil having a thickness of 20 µm, thereby forming thereon a carbon-based active material-containing coating film. The coating film was dried, and then roll-pressed for increasing the density of the active material layer, thereby forming a carbon-based active material layer. Accordingly, a negative electrode collector sample was thus produced. For the roll pressing, two conditions were employed here. The load per unit length in the roll axis direction (sample width direction) to be given by the roll to the sample (hereinafter referred to as "linear pressure") was 1 tonf/cm (980 kN/m) in one condition, and was 2 tonf/cm (1960 kN/m) in the other condition. In this, the negative electrode active material layer was formed on one surface alone of the metal foil to produce the negative electrode collector sample; however, even in the case where the active material layer is formed on both surfaces, the influence of the linear pressure on the density of the active material layer is basically the same as that in the case where the layer is formed on one surface alone. The linear pressure and the coating film thickness reduction ratio, as defined by the above-mentioned formula (1), are shown in Table 2.

[Measurement of Density of Active Material Layer]

A cross section of the negative electrode collector sample was polished in a mode of ion-milling, then the cross section was observed with an optical microscope equipped with a CCD camera. On the digital image of the cross section texture taken by the CCD camera, the thickness of the carbon-based active material layer was measured. In one sample, three views were observed, and the mean thickness of the active material layer was calculated. A disc sample having a diameter of 35 mm was blanked out of the negative electrode collector sample, and the mass of the disc sample was measured. Next, the disc sample was immersed in an N-methyl-2-pyrrolidone solution for 1 week so that the carbon-based active material layer on the surface of the sample was completely peeled off. The mass of the peeled test sample was measured. Using the mass difference before and after peeling the layer, and the found data of the mean thickness of the active material layer, the density of the active material layer was obtained. The results are shown in Table 2.

[Evaluation of Discharge Capacity]

A disc piece having a diameter of 15.958 mm (area of 2 cm$^2$) was blanked out of the negative electrode collector sample and used as a test piece for discharge capacity measurement. A globe box equipped with a vapor circulating purifier was used here. In the globe box in which the oxygen concentration and the moisture concentration were controlled to be at most 1 ppm each, an ordinary three-electrode test cell having a working electrode, a reference electrode and a counter electrode was constructed. As the test cell housing, used here was Hohsen Corp.'s HS-3E. In this, the above-mentioned test piece for discharge capacity measurement was set as a work electrode, and a metal lithium foil was used as the reference electrode and the counter electrode. As the separator to partition between the work electrode and the reference electrode and that to partition between the counter electrode and the reference electrode, used was a polypropylene-made porous film (thickness 25 μm). As the electrolytic solution, used was a solution prepared by dissolving $LiPF_6$ at a concentration of 1 mol/L in a mixed solvent of ethylene carbonate (EC) and diethyl carbonate (DEC) in a ratio by volume of 1/1.

Of each test cell, the oretical capacity that the active material has was calculated. Next, using the current value expressed by [theoretical capacity (mAh)]/5(h), the cell was completely charged, and then discharged at the same current value. The discharge capacity in this stage is referred to as [battery capacity (mAh)] of each test cell. Subsequently, this was completely charged at a constant charging rate of 0.5 CmA, and then discharged at a constant discharging rate of 1.0 CmA. This is one cycle, and each test cell was repeatedly tested for 10 cycles. On the 10th cycle, the discharge capacity $Q_{10}$ per unit volume of the active material layer was measured. The test temperature was 25° C. In this, the charging rate and the discharging rate are expressed by the following formulae (2) and (3), respectively.

[Charging Rate (CmA)]=[Battery Capacity (mAh)]/[Charging Time (h)]  (2)

[Discharging Rate (CmA)]=[Battery Capacity (mAh)]/[Discharging Time (h)]  (3)

The discharge capacity was evaluated using a collector sample with a copper foil as the metal foil (No. 12 in Table 2) as the standard sample, and the discharge capacity ratio defined by the following formula (4):

[Discharge Capacity Ratio]=[$Q_{10}$ of Test Sample to be evaluated]/[$Q_{10}$ of Standard Sample]  (4)

The results are shown in Table 2.

TABLE 2

| Group | No. | Type | Metal Foil — Steel Sheet | Metal Foil — Copper covering layer Formation Method | Metal Foil — Production Process | Metal Foil — Thickness t (μm) | Copper covering layer Thickness (on one surface) $t_{Cu}$ (μm) | $t_{Cu}/t$ | Roll Pressing — Linear Pressure (tonf/cm) | Roll Pressing — Coating Film thickness Reduction Ratio (%) | Negative electrode Collector Sample after roll pressing — Shape | Active Material Layer Mean thickness (μm) | Active Material Layer Density (g/cm³) | Discharge Capacity Ratio |
|---|---|---|---|---|---|---|---|---|---|---|---|---|---|---|
| Example of the Invention | 1 | copper-covered steel foil | common steel | copper plating | a | 20.0 | 0.9 | 0.0450 | 2 | 41 | good | 38 | 2.14 | 1.13 |
| Example of the Invention | 2 | copper-covered steel foil | common steel | copper plating | a | 20.0 | 0.5 | 0.0250 | 2 | 41 | good | 39 | 2.14 | 1.14 |
| Example of the Invention | 3 | copper-covered steel foil | common steel | copper plating | a | 20.0 | 0.1 | 0.0050 | 2 | 41 | good | 38 | 2.15 | 1.15 |
| Example of the Invention | 4 | copper-covered steel foil | common steel | copper plating | a | 20.0 | 0.05 | 0.0025 | 2 | 41 | good | 39 | 2.13 | 1.14 |
| Example of the Invention | 5 | copper-covered steel foil | common steel | copper plating | a | 20.0 | 0.02 | 0.0010 | 2 | 41 | good | 38 | 2.15 | 1.15 |
| Comparative Example | 6 | copper-covered steel foil | common steel | copper plating | a | 20.0 | 0.005 | 0.0003 | 2 | 41 | good | 38 | 2.14 | 0.18 |
| Example of the Invention | 7 | copper-covered steel foil | common steel | copper plating | a | 20.0 | 0.5 | 0.0250 | 1 | 32 | good | 45 | 1.84 | 1.01 |
| Example of the Invention | 8 | copper-covered steel foil | SUS304 | copper plating | b | 21.4 | 0.5 | 0.0234 | 2 | 41 | good | 38 | 2.14 | 1.13 |
| Example of the Invention | 9 | copper-covered steel foil | SUS304 | copper plating | b | 20.5 | 0.05 | 0.0024 | 2 | 41 | good | 39 | 2.13 | 1.14 |
| Example of the Invention | 10 | copper-covered steel foil | SUS430 | copper plating | b | 21.4 | 0.5 | 0.0234 | 2 | 41 | good | 38 | 2.15 | 1.15 |
| Example of the Invention | 11 | copper-covered steel foil | SUS430 | copper plating | b | 20.5 | 0.05 | 0.0024 | 2 | 41 | good | 38 | 2.14 | 1.14 |
| Comparative Example | 12 | copper foil | — | — | — | 20.0 | — | — | 1 | 31 | center buckled | 45 | 1.82 | 1.00 |
| Comparative Example | 13 | copper foil | — | — | — | 20.0 | — | — | 2 | — | broke | — | — | — |
| Example of the Invention | 14 | copper-covered steel foil | SUS430 | cladding | d | 20.0 | 0.5 | 0.0250 | 2 | 41 | good | 38 | 2.14 | 1.15 |
| Example of the Invention | 15 | copper-covered | SUS430 | cladding | e | 100 | 2.0 | 0.0200 | 2 | 40 | good | 39 | 2.10 | 1.16 |

TABLE 2-continued

| | | Metal Foil | | | | | | Negative electrode Collector | | | | |
|---|---|---|---|---|---|---|---|---|---|---|---|---|
| | | | | | | Copper covering layer | | Roll Pressing | | Sample after roll pressing | | |
| | | | Copper | | | | | | | Active Material | | |
| Group | No. | Type | Steel Sheet | covering layer Formation Method | Production Process | Metal Foil Thickness t (μm) | Thickness (on one surface) $t_{Cu}$ (μm) | $t_{Cu}/t$ | Linear Pressure (tonf/cm) | Coating Film thickness Reduction Ratio (%) | Shape | Layer Mean thickness (μm) | Active Material Layer Density (g/cm³) | Discharge Capacity Ratio |
| Example of the Invention | 16 | copper-covered steel foil | SUS430 | cladding | g | 15 | 4.5 | 0.3000 | 2 | 40 | good | 39 | 2.08 | 1.15 |
| Example of the Invention | 17 | copper-covered steel foil | SUS304 | copper plating | c | 8.0 | 0.2 | 0.0250 | 2 | 41 | good | 38 | 2.13 | 1.09 |
| Example of the Invention | 18 | copper-covered steel foil | SUS430 | cladding | f | 50 | 5.0 | 0.1000 | 2 | 40 | good | 39 | 2.09 | 1.15 |

In Comparative Example No. 12 in Table 2, a copper foil that has heretofore been used was used as a metal foil, and the densification of the active material layer was tried by strong roll pressing to such a degree as to provide center buckling (standard sample); and as compared with that in a negative electrode collector in conventional ordinary lithium ion secondary batteries, the active material layer density in this case was increased. In Comparative Example No. 13, the same copper foil as in No. 12 was used as the metal foil but further stronger roll pressing was tried therein. In this, therefore, the sample broke in the roll pressing step since the strength of the copper foil is low.

In Examples of the invention in Table 2, the copper-covered steel foil having, on the surfaces thereof, a copper covering layer with a thickness of at least 0.02 μm was used, and roll-pressed on the same level as or on a higher level than that in Comparative Example No. 12 (standard sample) to thereby density the active material layer therein. In these Examples, the collectors produced all had a good shape. Above all, in Examples where the samples were roll-pressed strongly to such a degree that copper foil would be broken (Nos. 1 to 5, 8 to 11, 14 to 18), the density of the active material layer was much more increased, and with that, the discharge capacity increased noticeably.

On the other hand, among the copper-covered steel foils, that in Comparative Example No. 6 was poor in the discharge capacity since the thickness $t_{Cu}$ of the copper covering layer was too small.

DESCRIPTION OF REFERENCE NUMERALS

1 Metal Foil
2 Coating Film
3 Roll
4 Active Material Layer
5 Uncoated Part
6 Steel Sheet
7 Copper covering layer
10 Copper-covered Steel Foil
40 Densified Negative Electrode Active Material Layer

The invention claimed is:

1. A copper-covered steel foil for carrying a negative electrode active material for a lithium ion secondary battery, which has a steel sheet as a core material thereof and has, on both surfaces thereof, a copper covering layer having a mean thickness $t_{Cu}$ of from 0.02 to 1.0 μm on each surface, and of which the total mean thickness, t, including the copper covering layer is from 3 to 100 μm with $t_{Cu}/t$ of at most 0.3.

2. The copper-covered steel foil as claimed in claim 1, wherein the copper covering layer is a copper electroplating layer (including one roped after plating).

3. The copper-covered steel foil as claimed in claim 1, wherein the steel sheet is loaned of a cold-rolled steel plate (including steel strip) as defined in JIS G3141:2009.

4. The copper-covered steel foil as claimed in claim 1, wherein the steel sheet has an austenitic or ferritic chemical composition as defined in JIS G4305:2005.

5. The copper-covered steel foil as claimed in claim 1, wherein the steel sheet has a composition comprising, in terms of % by mass, C: 0.001 to 0.15%, Si: 0.001 to 0.1%, Mn: 0.005 to 0.6%, P: 0.001 to 0.05%, S: 0.001 to 0.5%, Al: 0.001 to 0.5%, Ni: 0.001 to 1.0%, Cr: 0.001 to 1.0%, Cu: 0 to 0.1%, Ti: 0 to 0.5%, Nb: 0 to 0.5%, N: 0 to 0.05%, with a balance of Fe and an inevitable impurity.

6. The copper-covered steel foil as claimed in claim 1, wherein the steel sheet has a composition comprising, in terms of % by mass, C: 0.0001 to 0.15%, Si: 0.001 to 4.0%, Mn: 0.001 to 2.5%, P: 0.001 to 0.045%, S: 0.0005 to 0.03%, Ni: 6.0 to 28.0%, Cr: 15.0 to 26.0%, Mo: 0 to 7.0%, Cu: 0 to 3.5%, Nb: 0 to 1.0%, Ti: 0 to 1.0%, Al: 0 to 0.1%, N: 0 to 0.3%, B: 0 to 0.01%, V: 0 to 0.5%, W: 0 to 0.3%, total of Ca, Mg, Y, REM (rare earth metal): 0 to 0.1% with a balance of Fe and an inevitable impurity.

7. The copper-covered steel foil as claimed in claim 1, wherein the steel sheet has a composition comprising, in terms of % by mass, C: 0.0001 to 0.15%, Si: 0.001 to 1.2%, Mn: 0.001 to 1.2%, P: 0.001 to 0.04%, S: 0.0005 to 0.03%, Ni: 0 to 0.6%, Cr: 11.5 to 32.0%, Mo: 0 to 2.5%, Cu: 0 to 1.0%, Nb: 0 to 1.0%, Ti: 0 to 1.0%, Al: 0 to 0.2%, N: 0 to 0.025%, B: 0 to 0.01%, V: 0 to 0.5%, W: 0 to 0.3%, total of Ca, Mg, Y, REM (rare earth metal): 0 to 0.1%, with a balance of Fe and an inevitable impurity.

8. The copper-covered steel foil as claimed in claim 1, which has a tensile strength of from 450 to 900 MPa.

9. The copper-covered steel foil as claimed in claim 1, which has a tensile strength of from more than 600 to 900 MPa.

10. A negative electrode for a lithium ion secondary battery, which has an active material layer for the negative electrode of a lithium ion secondary battery, as formed on the surface of at least one copper covering layer of the copper-covered steel foil of claim 1.

11. A negative electrode for a lithium ion secondary battery, which has a carbon-based active material layer for the negative electrode of a lithium ion secondary battery, as formed on the surface of at least one copper covering layer of the copper-covered steel foil of claim 1, at, a density of at least 1.50 g/cm$^3$.

12. A negative electrode for a lithium ion secondary battery, which has a carbon-based active material layer for the negative electrode of a lithium ion secondary battery, as formed on the surface of at least one copper covering layer of the copper-covered steel foil of claim 1, at a density of at least 1.80 g/cm$^3$.

13. A negative electrode for a lithium ion secondary battery, which has a carbon-based active material layer for the negative electrode of a lithium ion secondary battery as formed on the surface of at least one copper covering layer of the copper-covered steel foil of claim 1, at a density of at least 2.00 g/cm$^3$.

14. A lithium ion secondary battery using the negative electrode of claim 10 for a negative electrode therein.

* * * * *